United States Patent [19]

Boddy et al.

[11] Patent Number: 5,477,390
[45] Date of Patent: Dec. 19, 1995

[54] MIRROR ASSEMBLY POWERED INTO REARWARDLY FOLDED POSITION AGAINST REVERSING SPRING BIAS

[75] Inventors: Ian Boddy, Ada; Donald S. Rawlings, Livonia, both of Mich.

[73] Assignee: Lowell Engineering Corp., Alto, Mich.

[21] Appl. No.: 106,650

[22] Filed: Aug. 16, 1993

[51] Int. Cl.⁶ ............................................. B60R 1/06
[52] U.S. Cl. ........................ 359/841; 359/872; 359/877
[58] Field of Search .................................. 359/841, 872, 359/874, 877

[56] References Cited

U.S. PATENT DOCUMENTS

| | | | |
|---|---|---|---|
| 4,585,200 | 4/1986 | Fisher | 248/487 |
| 4,592,529 | 6/1986 | Suzuki | 359/841 |
| 4,626,084 | 12/1986 | Kumai | 359/841 |
| 4,678,295 | 7/1987 | Fisher | 359/877 |
| 4,740,066 | 4/1988 | Whitehead | 359/841 |
| 4,740,068 | 4/1988 | Fisher | 359/877 |
| 4,836,490 | 6/1989 | Mittelhäuser et al. | 359/841 |
| 4,836,491 | 6/1989 | Fimeri | 248/549 |
| 4,840,475 | 6/1989 | Herzog et al. | 359/841 |
| 4,907,869 | 3/1990 | Schwarz et al. | 359/841 |
| 4,915,493 | 4/1990 | Fisher et al. | 359/877 |
| 4,932,766 | 6/1990 | Harry | 359/841 |
| 4,951,912 | 8/1990 | Manzoni | 359/841 |
| 4,957,265 | 9/1990 | Seitz | 359/841 |
| 4,969,727 | 11/1990 | Harloff et al. | 359/877 |
| 5,012,693 | 5/1991 | Enomoto et al. | 359/841 |
| 5,061,056 | 10/1991 | You | 359/872 |
| 5,091,804 | 2/1992 | Seitz | 359/841 |
| 5,099,362 | 3/1992 | Mittelhäuser et al. | 359/877 |
| 5,124,846 | 6/1992 | Seitz et al. | 359/841 |

FOREIGN PATENT DOCUMENTS

| | | | |
|---|---|---|---|
| 2232897 | 1/1974 | Germany | 650/91 |
| 3923922 | 1/1991 | Germany | B60R 1/06 |
| 58-171745 | 11/1983 | Japan | B60R 1/06 |
| 59-151851 | 10/1984 | Japan | B60R 1/06 |
| 053442 | 3/1985 | Japan | B60R 1/06 |

Primary Examiner—Paul M. Dzierzynski
Assistant Examiner—John Juba, Jr.
Attorney, Agent, or Firm—Cushman, Darby & Cushman

[57] ABSTRACT

A rearview mirror assembly comprising a fixed support structure, a movable mirror housing structure having a mirror unit adjustable mounted therein, and a spring-biased mounting assembly mounting the movable structure on the fixed structure (1) for spring-biased movement into a normal operating position wherein said movable structure extends laterally outwardly from the exterior of the vehicle where it is susceptible to the application of unwanted forwardly directed forces or unwanted rearwardly directed forces, (2) for movement forwardly through a forward range of movement out of said operative position in response to the application of unwanted forwardly directed force so that upon release of the force the spring bias is operable to return the movable structure to its operative position and (3) for movement rearwardly through a rearward range of movement out of the operating position in response to the application of an unwanted rearwardly directed force sufficient to overcome the spring bias which spring bias decreases to zero as the distance of rearward movement of the movable structure out of the operative position increases to an intermediate point within the rearward range of movement and thereafter reverses to bias the movable structure into a rearwardly folded limiting position. A power-driven assembly is provided for applying a yieldable force pattern to the movable structure to overcome the spring bias within the rearward range of movement so as to selectively move the movable structure between the operative and rearwardly folded limiting positions.

22 Claims, 5 Drawing Sheets

MIRROR ASSEMBLY POWERED INTO REARWARDLY FOLDED POSITION AGAINST REVERSING SPRING BIAS

This invention relates to rearview mirror assemblies and more particularly to improvements in rearview mirror assemblies of the type adapted to be mounted on the exterior of a motor vehicle so as to be viewed by the vehicle driver.

Exteriorly mounted rearview mirror assemblies are well known and commonly provided on both sides of almost all motor vehicles usually on the forward portion of the doors so that they can be viewed through the door windows by the vehicle driver within the vehicle. Typically, such mirror assemblies include a mirror housing structure which, in its normal viewing position, extends laterally outwardly from the side of the vehicle to which it is attached. The mirror housing structure typically has a shell-like configuration which is open rearwardly and provides a rounded forwardly extending surface. A mirror unit is adjustably mounted within the mirror housing structure so as to extend within the open rear of the mirror housing structure. Usually, a remotely controlled mechanism for effecting movement of the mirror unit into an adjustable position suitable to the driver is provided for actuation by the driver within the vehicle. The adjusting mechanism can be a mechanical 3-Bowdine wire system controlled by a manual lever or a power-operated system controlled by a manual lever.

The inherent laterally outwardly extending position and cantilever mounting of the mirror housing structure makes the mirror assembly vulnerable to accidental damage and vandalism. Moreover, the outwardly protruding mirror assemblies require space which sometimes is not readily available, such as in crowded garages and other parking areas. The space problem presented by exterior rearview mirror assemblies is so acute under motor vehicle shipping conditions that they are often removed for shipment.

The conditions discussed above are so well known and vexatious that many of the mirror assemblies presently being marketed have separated the mirror housing structure into two components, a fixed support structure which can be fixed to the side of the vehicle in a generally non-protruding manner and a separate mirror housing structure which is movably mounted with respect to the fixed support structure.

Typically, a movable mirror housing assembly is spring biased into its normal operating position and mounted so that the application of either a rearwardly or forwardly directed force on the movable structure sufficient to overcome the spring bias will result in the movable mirror housing structure moving either rearwardly or forwardly so that, when the application of the force is released, the spring bias is operable to return the movable structure into its operative position. This foldaway and return action serves to prevent damage which might otherwise occur when the mirror housing structure is fixed and subjected to the application of a rearwardly or forwardly directed force. There are generally two different arrangements provided to achieve the foldaway and return functions. One is the so-called alternate pivot arrangement and the other is the two-pivot arrangement. Examples of the two-pivot type mirror assembly are found in the following U.S. Pat. Nos. 4,840,475, 5,061,056, and 5,091,804, and German Patent No. 2,232,897.

In addition to the ability to reduce damage by the foldaway and return functions, it has been found desirable to build into the mirror assembly the capability of retaining the movable mirror housing structure in a foldaway limiting position. Such a capability has easily recognized advantages for shipping. In some countries, vehicle space is at such a premium that vehicle owners are required to place their mirror assemblies in such foldaway limiting positions for parking. Indeed, this capability is sufficiently desirable that it has been proposed to provide for the selective power-operated movement of the movable mirror housing structure between an operative and rear foldaway limiting position. See, for example, U.S. Pat. No. 4,969,727.

A disadvantage of the power-operated movement arrangement disclosed in the '727 patent is that the power-operating assembly is operable between the fixed structure and a mounting arm to control rearward movement of the movable structure with the mounting arm. A spring biases the movable structure to move rearwardly with the mounting arm. Forward movement of the movable structure causes both a relative movement between the movable structure and the mounting arm which stresses the spring and a relative movement of the mounting arm with respect to the fixed structure which must override the power-operating assembly or cause the power-operating assembly to yield. Consequently, the application of an unwanted forwardly directed force on the movable structure can effect a forward movement. However, when the force is removed or released, the movable structure cannot be returned to its operative position because the spring can only return the movable structure back into a stop position with respect to the mounting arm. It cannot return the mounting arm back into its stop position so as to carry the movable structure back into its operating position. In a situation where the unwanted forwardly directed force is applied and removed by a moving car while the mirrored vehicle is parked, the position of the mirror will remain out of its operative position which may present a problem to a driver who is relying on the fact that the mirror was in its operative position when the vehicle was parked.

It is an object of the present invention to obviate the disadvantage noted above. In accordance with the present invention, this objective is achieved by providing a rearview mirror assembly for mounting on the exterior of a motor vehicle so as to be viewed by the driver within the vehicle. The rearview mirror comprises a fixed support structure adapted to be fixed to the exterior of the vehicle, a movable mirror housing structure, a spring-biased mounting assembly mounting the movable structure on the fixed structure (1) for spring-biased movement into a normal operating position wherein the movable structure extends laterally outwardly from the exterior of the vehicle where it is susceptible to the application of unwanted forwardly directed forces or unwanted rearwardly directed forces, (2) for movement forwardly through a forward range of movement out of the operative position in response to the application to the movable structure of an unwanted forwardly directed force sufficient to overcome the spring bias of the movable structure into its operative position which spring bias increases as the distance of forward movement of the movable structure out of its operating position within the forward range of movement increases so that upon release of the application of the unwanted forwardly directed force while the movable structure is within the forward range of movement the spring bias is operable to return the movable structure to its operative position and (3) for movement rearwardly through a rearward range of movement out of its operating position in response to the application to the movable structure of an unwanted rearwardly directed force sufficient to overcome the spring bias of the movable structure into its operative position which spring bias decreases to zero as the distance of rearward movement of the movable structure out of its operative position increases to an intermediate point within the rearward range of movement and thereafter reverses to bias the movable structure into a rearwardly folded limiting position so that upon release of the application of the unwanted rearwardly directed force while the movable structure is within the rearward range of movement the spring bias is operable to return the movable structure to its operative position or to move the movable structure into its rearwardly folded limiting position depending upon the distance of rearward movement which has taken place. A mirror unit is mounted with respect to the movable structure for movement into any position within a range of movement positions suitable to accommodate different drivers. A power-driven assembly operatively connected with the movable structure for permitting the aforesaid forward movement of the movable structure within its forward range of movement and for applying a yieldable force pattern to the movable structure sufficient to overcome the spring bias within the rearward range of movement so as to selectively move the movable structure between its operative and rearward foldaway limiting position while enabling the movable structure to be moved rearwardly from the operative position within the rearward range of movement by the application of an unwanted rearwardly directed force to the movable structure sufficient to overcome the yieldable force pattern of the power-driven assembly.

The mirror assembly referred to above relies upon an advantage of a manually operated mirror assembly of the type disclosed in commonly assigned application Ser. No. 08/106,756 filed concurrently herewith. The advantage is that the spring bias provided which serves to return the movable structure after a rearward movement does not simply increase as the amount of rearward movement increases. Instead, the spring bias decreases to zero and then reverses and thereafter slightly increases until the rearward foldaway limiting position is reached. Since the maximum spring bias force applied during rearward movement is thus limited, it becomes possible to provide a power-operating assembly which can override the spring bias and, at the same time, incorporate a yieldable force pattern sufficient to allow rearward movement in response to the application of an unwanted rearwardly directed force.

Another object of the present invention is the provision of a rearview mirror assembly of the type defined which is simple in construction, effective in operation and economical to manufacture.

These and other objects of the present invention will become more apparent during the course of the following detailed description and appended claims.

The invention may best be understood with reference to the accompanying drawings wherein an illustrative embodiment is shown.

Referring now more particularly to the drawings, there is shown therein a rearview mirror assembly, generally indicated at 10, which embodies the principles of the present invention. The rearview mirror assembly 10 shown in the drawings is adapted to be mounted on the right side of a motor vehicle. Typically, the mounting would be on the forward central portion of the right door at the window level in a position to be viewed by the driver looking through the right window so the mirror would reflect the image rearward of the vehicle. It will be understood that the present invention contemplates a left hand rearview mirror assembly constructed like the assembly 10 except that the parts would be in a mirror image relationship to the structure of the assembly 10.

As previously indicated, the rearview mirror assembly 10 relies upon an advantage which exists in the manually operable rearview mirror disclosed in the aforesaid concurrently filed application. Hence, it is appropriate to first describe the construction of the manually operable mirror assembly and then the describe the modifications made in accordance with the principles of the present invention. As shown, the rearview mirror assembly 10 includes a fixed support structure, generally indicated at 12, which is adapted to be fixedly secured to the appropriate side of the vehicle specifically the door as previously described. The rearview mirror assembly 10 also includes a movable mirror housing structure, generally indicated at 14, which cooperates with the fixed structure. A spring-biased mounting assembly is provided for mounting the movable structure 14 on the fixed structure 12. The spring-biased mounting assembly includes essentially four components, a mounting arm 16 which is pivotally connected with the fixed structure 12 for movement with respect thereto about a first generally vertically extending axis toward and away from a stop position with respect to the fixed structure 12. The movable structure 14 is pivotally connected with the mounting arm 16 for movement with respect thereto about a second axis extending generally parallel with the first axis toward and away from a stop position with respect to the mounting arm 16.

Figure 1:
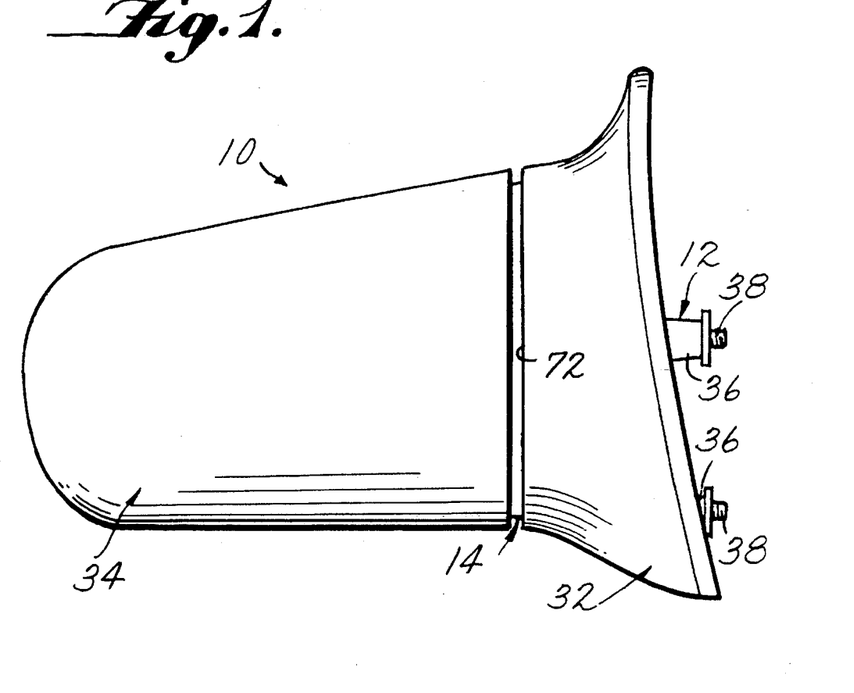
FIG. 1 is a perspective view of a right hand rearview mirror assembly embodying the principles of the present invention, the view looking toward the mirror rearwardly and inwardly shows the movable mirror housing structure of the assembly in its operative position.
Figure 2:
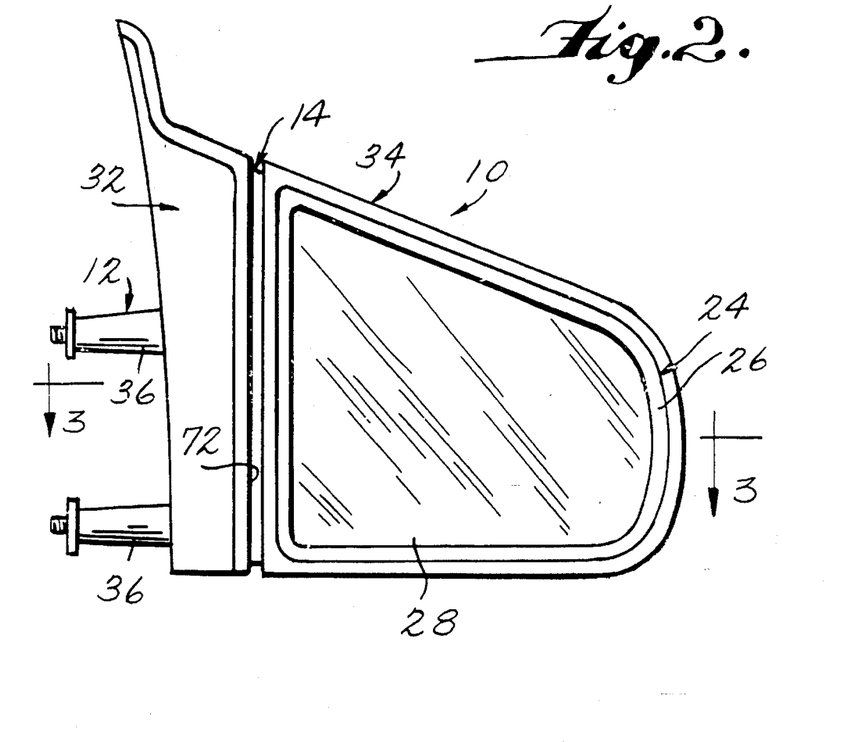
FIG. 2 is a front elevational view of the mirror assembly shown in FIG. 1.
Figure 3:
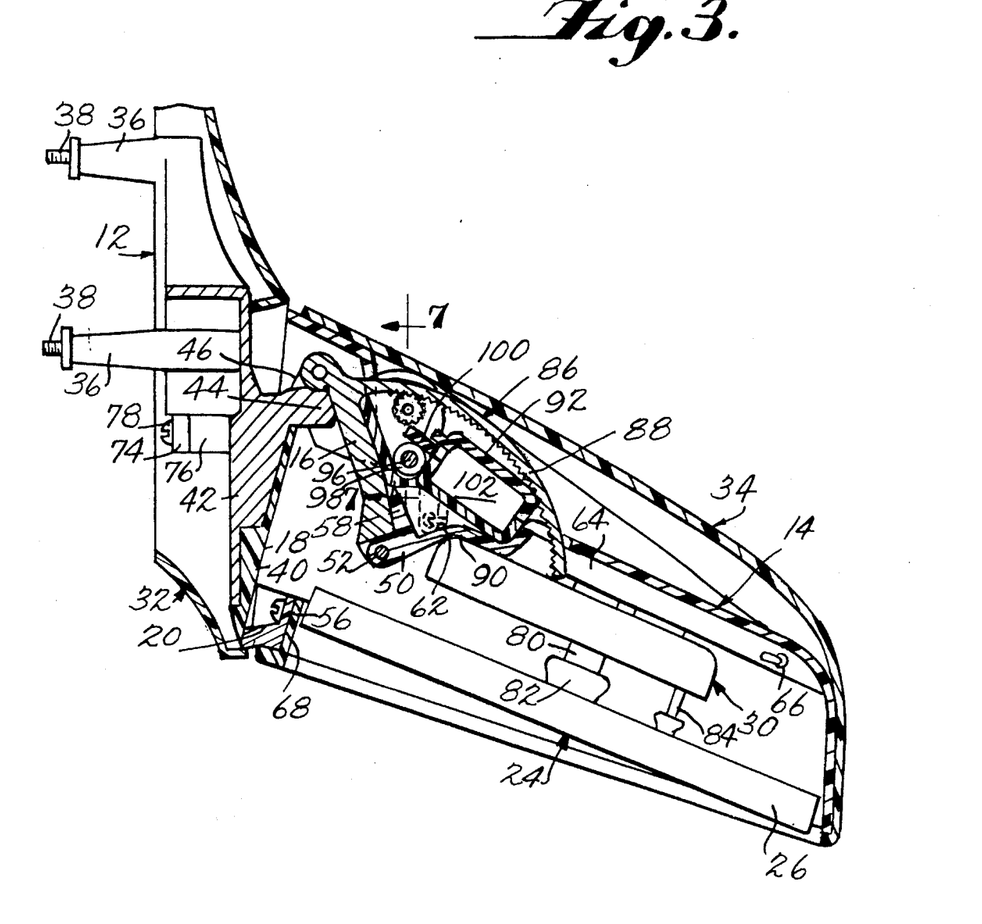
FIG. 3 is a sectional view taken along the line 3—3 shown in FIG. 2.
Figure 4:
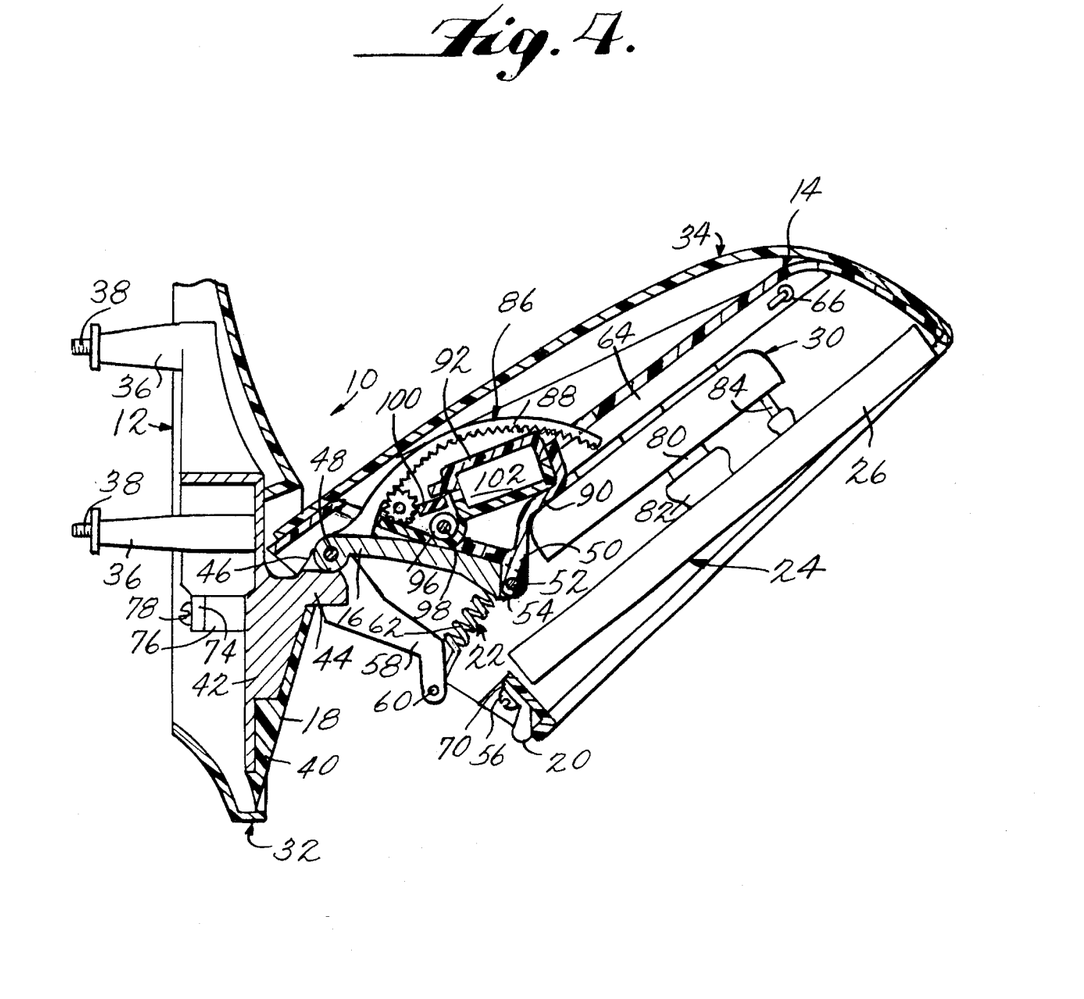
FIG. 4 is a view similar to FIG. 3, showing the movable mirror housing structure in a forward foldaway position.

The spring-biased mounting assembly also includes a cam surface 18 on the fixed structure 12, a cam follower 20 on the movable structure 14, and a spring system, generally indicated at 22, connected between the fixed structure 12 and the movable structure 14. The spring system 22 serves to resiliently bias the movable structure 14 into a normal operating position, as shown in FIGS. 1–3, wherein the movable structure 14 extends laterally outwardly from the exterior of the vehicle where it is susceptible to the application of unwanted forwardly directed forces or unwanted rearwardly directed forces. The spring-biased mounting assembly 16, 18, 20, and 22 also serves to mount the movable structure 14 on the fixed structure 12 for movement forwardly, as shown in FIG. 4, through a forward range of movement out of the operative position in response to the application to the movable structure 14 of an unwanted forwardly directed force sufficient to overcome the spring bias of the movable structure 14 into its operating position, which spring bias increases as the distance of forward movement of the movable structure out of the operating position within the forward range of movement increases so that, upon release of the application of the unwanted forwardly directed force while the movable structure 14 is within the forward range of movement, the spring bias is operable to return the movable structure 14 to its operative position.

Spring-biased mounting assembly 16, 18, 20, and 22 is also operable to mount the movable structure 14 on the fixed structure 12 for movement rearwardly through a rearward range of movement out of the operating position in response to the application to the movable structure of an unwanted rearwardly directed force sufficient to overcome the spring bias of the movable structure into its operative position which spring bias decreases to zero as the distance of the rearward movement of the movable structure out of the operative position reaches or increases to an intermediate point within the rearward range of movement and thereafter reverses and increases to bias the movable structure into a rearwardly folded limiting position.

It will be understood that the movable mirror housing structure 14 has adjustably mounted therein a mirror unit, generally indicated at 24, which includes a mirror frame 26 and a mirror 28. As shown, the mirror unit 24 is mounted for adjustable movement on a power pack assembly, generally indicated at 30, which, in turn, is fixedly carried by the movable structure 14. The power pack assembly 30 not only serves to mount the mirror unit 26 on the movable mirror housing structure 14 but also serves to effect the adjusting movements in response to the actuation of a remote control lever (not shown) accessed by the driver.

For inventory efficiency purposes, the fixed support structure 12 and movable mirror housing structure 14 are both formed in unfinished condition and separate fixed and movable cover members, generally indicated at 32 and 34, are provided so as to be mounted in covering relation with respect to the fixed and movable structures respectively while the movable structure 14 is mounted on the fixed structure 12. The separate fixed and movable cover members 32 and 34 are adapted to be fixedly secured to the fixed and movable structures respectively after being mounted in covering relation so as to present finished exterior surfaces which substantially completely cover the fixed and movable structures when the movable structure 14 is in its operative position with respect to the fixed structure 12 while permitting both the forward range of movement as well as the rearward range of movement. The exterior surfaces of the cover members 32 and 34 are preferably of a color which matches the vehicle color and finish.

The fixed structure 14 may assume any desired configuration and may be formed of any desirable materials. The preferred embodiment shown is a metal casting which provides a plurality of mounting legs 36 having threaded studs 38 extending therefrom to effect the fixed securement to the side of the motor vehicle door or the like. Preferably, the cam surface 18 on the fixed structure 12 is provided by a plastic insert 40 which is formed of a suitable plastic material having anti-friction characteristics, as, for example, Teflon or other similar materials. It will be noted that the cam surface insert 40 is formed on a base portion 42 of the fixed structure casting. The cam surface 18 is essentially a flat surface extending from the rearward end of the fixed support base portion 42 forwardly and slightly laterally outwardly therefrom. Extending laterally outwardly from the base portion 42 beyond the forward edge of the cam surface insert 40 is a mounting portion 44 having a pair of vertically spaced lugs 46 extending forwardly thereof. A forward end of the mounting arm 16 extends between the lugs 46 and the lugs 46 and mounting arm 16 are apertured to receive a pivot pin 48 which defines the first pivotal axis of the mounting arm 16. The laterally outward end of the mounting portion 44 engages an adjacent portion of the mounting arm 16 when the mounting arm 16 is in its stop position, as shown in FIG. 3. The mounting arm 16 is thus capable of pivotal movement in a counterclockwise direction, as viewed in FIG. 3, away from the stop position and in an opposite direction into the stop position.

The movable mirror housing structure 14 is essentially in the form of a thin wall plastic molding which is open at its laterally inward end and at its rearward end. The thin wall molding includes a rearwardly projecting central portion 50 which is apertured to receive a pivot pin 52. The mounting arm 16 includes rearwardly extending lugs 54 which are likewise apertured to receive the pivot pin 52. The pivot pin 52 serves to pivotally mount the movable structure 14 on the end of the mounting arm 16 and it will be noted that central portion 50 engages the mounting arm 16 when the movable structure 14 is in its stop position with respect to the mounting arm 16.

The movable structure 14 also includes a fixed cross member 56 at the laterally inward and rearward portion thereof. The cross member 56 is integral with the cam follower 20 which is rounded laterally inwardly so as to slidably engage the cam surface 18.

Figure 6:
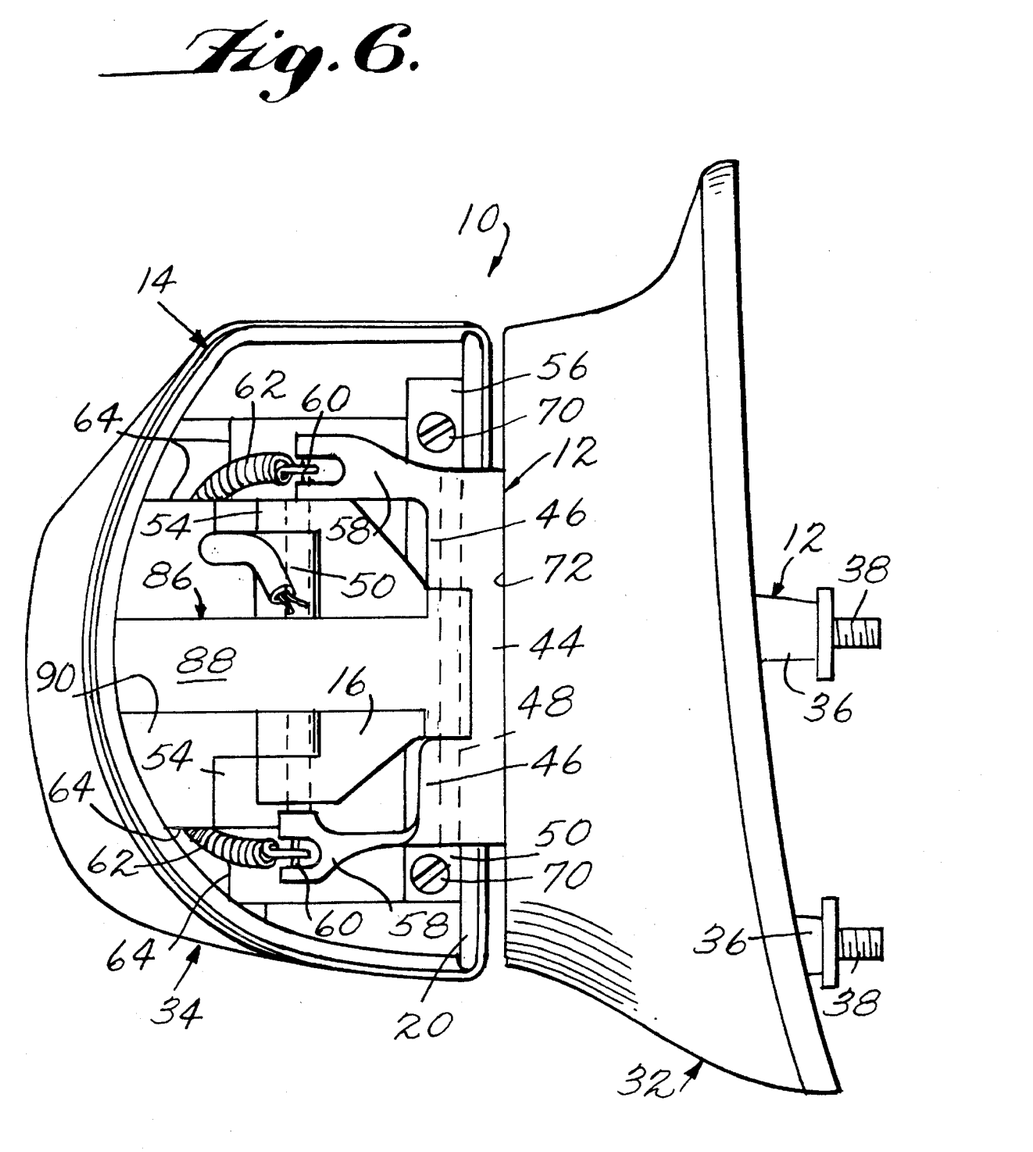
FIG. 6 is a view similar to FIG. 1 showing the movable mirror housing structure in a rearward foldaway limiting position.

Formed integrally on the mounting portion of the fixed structure 12 adjacent the outer ends of the lugs 46 is a pair of spring mounting arms 58 which extend laterally outwardly and rearwardly and then directly rearwardly. The rearward end of each spring mounting arm 58 is bifurcated and bored to receive a mounting pin 60 which extends across the bifurcation. The spring system 22, as shown, consists essentially of two separate coil springs 62, one end of each of which is formed into a hook configuration for engagement with an associated pin 60. Each spring 62 extends from its connection with the pin 60 through an opening and onto a laterally outwardly extending ledge 64 formed on the movable structure 14. As best shown in FIG. 6, the ledges 64 are spaced vertically above and below the central portion 50 of the movable member, the lower ledge 64 being defined by angular wall portions spacing downwardly and forwardly and the upper ledge 64 being defined by angular wall portions facing upwardly and forwardly. The opposite end of each spring 62 is also formed into a hook which is engaged within an opening 66 formed in a laterally outer portion of an associated ledge defining wall.

It will be understood that the spring system 22 need not be provided as two separate springs 62 separately connected as indicated. They could form a part of an assembly which includes a pivoted cross member (see Japanese Patent Publications No. 59-151851 and No. 58-171745) or they could be a single spring which has a U-shaped bight portion mounted in a transverse ledge interconnecting the outer ends of the spaced ledges 56 formed in the movable structure (see U.S. Pat. No. 4,836,491).

The power pack assembly 30 is preferably a remotely controlled power operated unit of the type which is disclosed in commonly assigned U.S. Pat. Nos. 4,678,295, 4,740,068, and 4,915,493, the disclosures of which are hereby incorporated by reference into the present specification. It is also within the contemplation of the present invention to utilize a remotely controlled manual mounting such as a 3-bowdine wire system. An example of a system of this type is disclosed in commonly assigned U. S. Pat. No. 4,585,200 and its specification is likewise incorporated by reference into the present specification.

The movable cover member 34 is preferably in the form of a thin wall shell having upper, lower, forward and laterally outward merging wall portions defining a finished convexly curved exterior surface. Fixedly interconnected between the rearward laterally inward corners of the upper and lower wall portions is a mounting strap 68. The mounting strap 68 defines with the rearward edges of the upper, lower and laterally outward wall portions a rearward opening through which the mirror unit 24 is disposed and with the laterally inward edges of the upper, lower, and forward wall portions, a laterally inward opening through which the movable mirror housing structure 14 is disposed. The movable cover member 34 is mounted on the movable structure 14 by engaging the laterally outward end of the movable structure 14 through the laterally inward opening. In this regard, it will be noted that the horizontal dimension of the laterally outer end portion of the movable structure is considerably less than the horizontal dimension of the opening which extends to the mounting strap 68. The mounting strap 68 includes groove to receive the rearwardly extending edges of the movable structure 14. Consequently, after the outer end portion of the movable structure 14 has been inserted within the lateral opening, the cover member 34 is moved forwardly so that the central portion of the mounting strap 68 will enter between the rearward edges of the movable structure 14. The movable member can then be moved laterally inwardly into its fixed operating position with respect to the movable structure 14 wherein the mounting strap engages the cross portion 56 of the movable structure 14. Thereafter, threaded fasteners 70 are utilized to fixedly secure the cover member 34 to the movable structure 14. It will be noted that the edges defining the lateral opening of the movable cover member are spaced laterally outwardly slightly from the edges which define the laterally inward periphery of the movable structure 14.

The fixed cover member 32 is in the form of an irregular tubular wall having a laterally outward peripheral edge 72 disposed in closely spaced relation with the laterally inward edges defining the laterally inward opening of the movable cover member 34 when the movable structure 14 is in the operative position. The tubular wall includes a pair of vertically spaced inwardly extending lugs 74 which mate with lugs 76 extending laterally inwardly from the base portion 42 of the fixed structure 12 when the fixed cover member 32 is in operative relation with the fixed structure 12. Fasteners 78 serve to effect a fixed securement between the fixed cover member 32 and the fixed structure 12.

The fixed cover member 32 is mounted in operative relation with the fixed structure 12 by feeding the forward portion of the fixed structure 12 through the opening of the tubular wall and, by maneuvering the tubular wall, it can then be turned into a position where the lugs 74 are in appropriate engagement with the lugs 76 to receive the fasteners 78 and effect the fixed securement.

In this regard, it will be noted that both the cover members 32 and 34 can be mounted to their respective structures 12 and 14 while the two structures are interconnected. Preferably, the mirror unit 24 is mounted in assembled relation by moving the same forwardly through the rear openings provided by the movable structure 14 and movable cover member 34 fixed thereto. In this regard, mounting of the mirror unit 30 is effected by cooperating snap-in connectors 80 and 82 which enable the mirror unit 30 to be adjusted in any direction about a single pivot point. The 90° displaced moving members 84 of the power pack assembly 30 are likewise snapped into connection with the mirror unit 30 to effect movement of the mirror unit 30 into any desired position.

In accordance with the principles of the present invention, the mirror assembly 10 thus far described is modified by adding a power-driven assembly, generally indicated at 86, which is operatively connected between the movable structure 14 and the mounting arm 16. The power-driven assembly 86 includes an arcuate gear rack 88 fixed integrally at one end to the end portion of the mounting arm 16 pivoted to the fixed structure 12 about pivot pin 48.

The gear rack 88 is arcuate about the axis of the opposite pivot pin 52 which serves to connect the opposite end of the mounting arm 16 with the movable structure 14. The gear rack includes two sets of spaced gear teeth on the concave side thereof.

The remainder of the power-driven assembly 86 is carried by the movable structure 14. More particularly, the assembly 86 is mounted within a cavity formed in the central portion of the movable structure 14 forwardly of the portion 50 which receives the pivot pin 52. In this regard, it will be noted that, when the movable structure 14 is in its operative position, the arcuate gear rack 88 extends through an opening in the central portion of the wall adjacent the mounting arm and the outer end of the gear rack 88 extends through an opening in the central wall between the ledges 64. The components of the power-driven assembly 86 carried by the movable structure 14 are housed within a pair of housing parts 90 and 92 which are suitably fixed to the movable structure 14 within the recess previously described.

Figure 7:
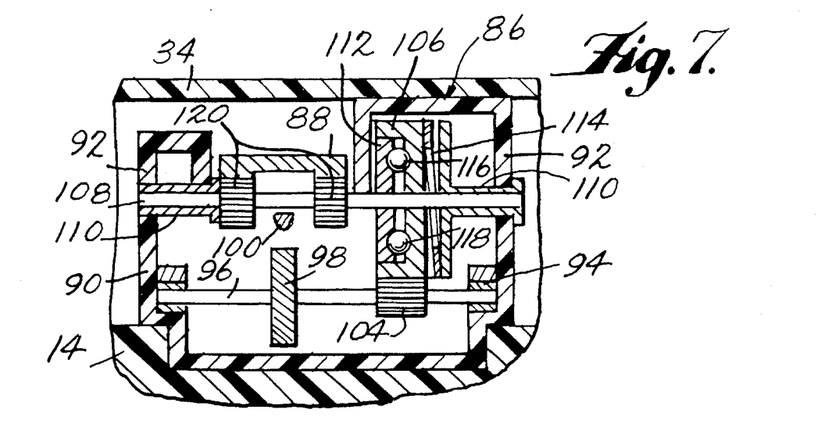
FIG. 7 is an enlarged fragmentary sectional view taking along the line 7—7 of FIG. 3.

As best shown in FIG. 7, the rearward housing part 90 includes vertically spaced semi-cylindrical concave ledges which receive a pair of spaced bearings 94 within which the ends of a first drive shaft 96 are journalled. Fixed to the drive shaft 96 is a worm pinion 98 which meshes with a worm gear 100 driven by an electric motor 102 mounted within a pocket of the rearward housing part 90. Fixed to the first shaft 96 in axially spaced relation from the worm pinion 98 is a clutch driving pinion 104. The clutch driving pinion 104 meshes with a larger clutch pinion member 106 which is mounted on a second parallel shaft 108 for relative rotational and axial movement with respect thereto. The ends of the shaft 108 are mounted within a pair of bearings 110 suitably engaged within semi-circular grooves formed in the upper edge of the rearward housing part 90.

The forward housing part 92 includes cooperating semi-circular grooves engaging the bearings 110 which serve to fix their position. The forward housing part 92 also includes rearwardly extending arms having lower ends which are formed with semi-cylindrical surfaces engaging the bearings 94 which serve to fix their position. It will be understood that suitable fasteners (not shown) extend between the housing parts 90 and 92 and into the movable structure 14 to fixedly mount the housing parts on the movable structure.

Still referring to FIG. 7, it will be noted that the righthand bearing 110 has integrally formed on the inner end thereof a clutch disk member 112 which engages one end of a spring 114 which also engages the clutch pinion member 106. The spring 114 serves to resiliently bias the clutch pinion member 106 toward the clutch. The spring 114 biases the clutch pinion member 106 toward a disk member 112 which is fixed to the shaft 108. Rotatably mounted within the face of the clutch disk member 112 which faces the clutch pinion 106 is a plurality of balls 116. The balls 116 extend outwardly of the clutch disk member 112 and are adapted to engage within a corresponding series of depressions 118 shaped to receive end portions of the balls 116. It can be seen that the clutch members 106 and 112 together with the spring 114 and balls constitute a clutch. The spring 114 of the clutch biases the clutch pinion member 106 so that it tends to move toward the clutch disk member 112. When the clutch pinion member 106 is moved by clutch driving pinion 104 in response to the movement of the first drive shaft 96, the bias of the spring 114 will cause the balls 116 to engage within the depressions 118 so as to establish a yieldable driving relationship between the clutch members 106 and 112. The driving of the clutch disk member 112 will, in turn, rotate the second shaft 108 and the latter has fixed thereon a pair of spaced pinions 120 which are disposed in meshing relation with the teeth of the arcuate gear rack 88. It will be understood that the forward housing part 92 is formed with an appropriate opinion which enables this meshing relation to be established.

The motor 102 is preferably a reversible electric motor which includes electric wires which are extended through suitable openings in the fixed structure so as to extend to a remote control lever (not shown) mounted in an access position with respect to the driver of the vehicle. The control lever in its normal position retains the motor 102 in a normal non-energized condition. When the control lever is moved to a direction indicating a rearward movement, the wire hookup is such as to energize the motor 102 to rotate the worm 100 in a direction to cause the worm pinion 98 to rotate the first shaft 96 in a clockwise direction as viewed in FIG. 3. This rotational movement of the shaft 96 will, in turn, effect movement of the clutch driving pinion 104 which meshes with the clutch pinion member 106 causing the latter to rotate. The yieldable connection between the clutch pinion member 106 and the clutch disk member 112 will, in turn, effect a counterclockwise rotational movement of the shaft 108 as viewed in FIG. 3, which movement is also imparted to the rack pinions 120 fixed on the shaft 108. As the rack pinions 120 rotate, they mesh with the teeth on the arcuate gear rack 88. This meshing engagement tends to pivot the mounting arm 16 which is integral with the arcuate rack 88 in a clockwise direction as viewed in FIG. 3. Since such movement is not possible when the mounting arm 16 is in the stop position shown in FIG. 3, the rotation of the rack pinions 120 will cause the entire movable structure 14 to move about the axis of the pivot pin 52. In this regard, it will be noted that the operation of the motor 102 and the gear train assembly thus far described is designed so as to impart to the rack pinions 120 a force pattern which is sufficient to overcome the spring bias of the springs 62 as the movable structure 14 is moved rearwardly. During this rearward movement, cam follower 20 slides forwardly on cam surface 18 which causes the mounting arm 16 to pivot in a counterclockwise direction as viewed in FIG. 3 about the axis of pivot pin 48. When the cam follower 20 reaches the stop position, the movement of the movable structure 14 is likewise stopped which, in turn, means that the rack pinions 120 will no longer move which, in turn, stops the clutch disk member 112 from movement which is also fixed to the stopped shaft 108. If the control lever is still in the rearward position, the continued rotational movement of the clutch pinion member 106 in response to the rotation of the motor 102 will be such that, as the depressions 118 move past the balls 116, the clutch pinion member 106 will be biased to the right, as viewed in FIG. 3, against the action of the spring 114 and continued movement of the pinion will allow the balls 116 to re-enter the depressions 118 under the action of the spring 114. In this way, the clutch pinion member 106 can continue to rotate and reciprocate axially without any movement of the clutch disk member 112 taking place.

Figure 5:
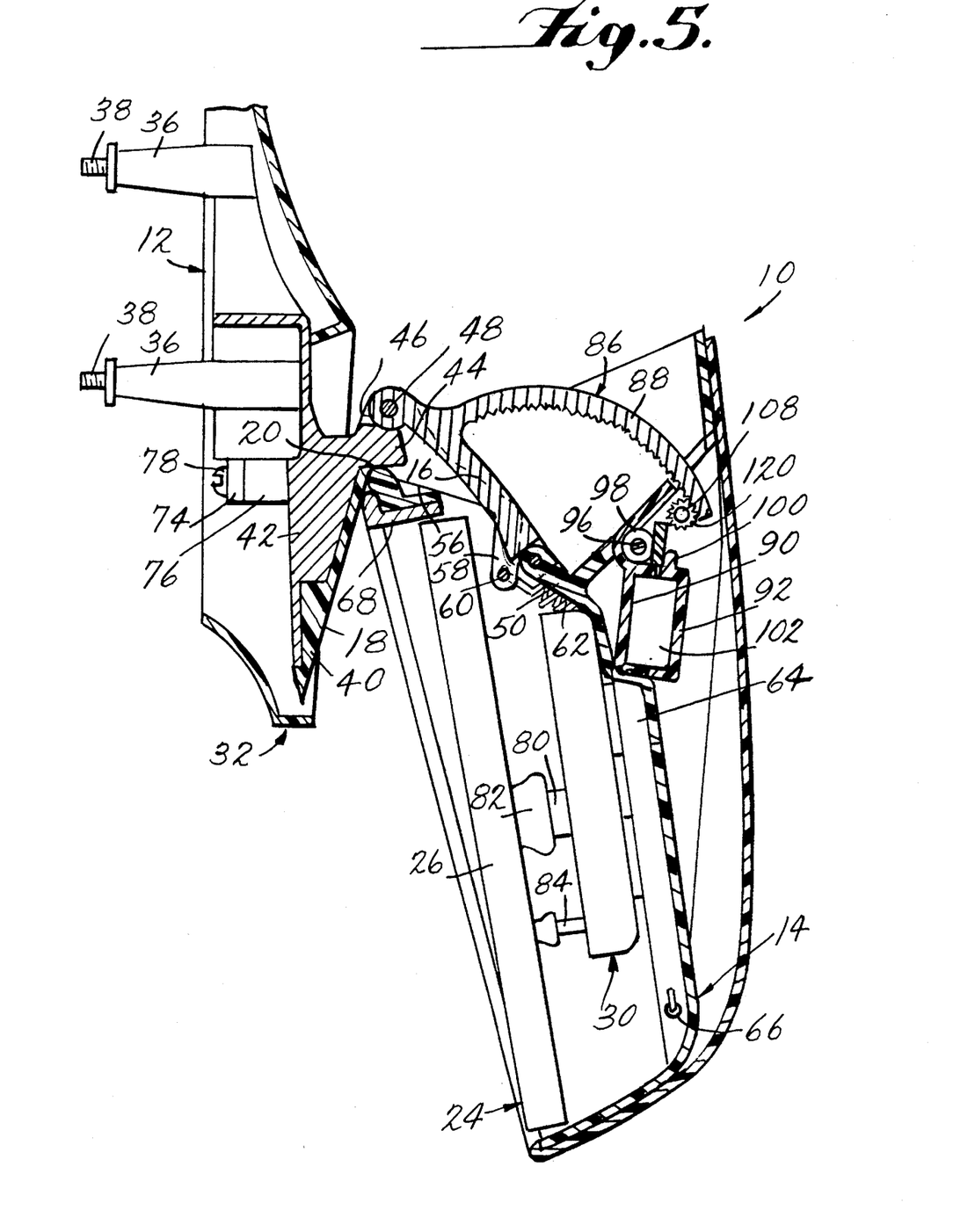
FIG. 5 is a view similar to FIG. 3, showing the movable mirror housing structure in a rearward foldaway limiting position.

The strength of the spring 114, the size of the balls 116, and the depth of the depressions 118 will determine the condition of the force pattern where yielding will take place. The conditions are chosen so that the yielding force is in excess of the maximum spring pressure which is applied by the springs 62 during the movement of the movable structure 14 from its operative position into its rearwardly folded limiting position. In this way, the power-driven assembly 86 is under the manual control of the driver to effect a movement of the movable structure 14 from its operative position into its rearwardly folded position, as shown in FIG. 5, simply by actuating the control lever.

Providing a clutch which yields by virtue of balls riding out of depressions is preferred because the yielding condition can be set at a fairly high value. Nevertheless, in the broadest aspects of the present invention, a clutch providing yieldable interengaging planar surfaces, instead of the preferred ball depression arrangement, is contemplated.

The control lever also includes a forward position which serves to reverse the electrical connection of the motor 102 so that it will rotate in a direction to cause the worm pinion 98 to rotate in a counterclockwise direction, as viewed in FIG. 3. This movement is transmitted to the rack pinions 120 through the clutch driving pinion 104 and the interengaged clutch members 106 and 112 so that the shaft 108 is turned in a clockwise direction, as viewed in FIG. 3. This rotational movement will cause the movable structure 14 to move forwardly about the axis of pivot pin 52 from its rearwardly folded limiting position, as shown in FIG. 5, back into its operative position, as shown in FIG. 3.

It will also be noted that the yielding of the clutch will enable the movable structure 14, the movable cover member 34 and the mirror unit 24 to be moved rearwardly in response to the application of an unwanted rearwardly directed force. However, when the force is removed or released, the movable structure 14 will be retained in the position it has been moved rearwardly by the unwanted rearwardly directed force. During this rearward movement, the rack pinions 120 will be moved in a counterclockwise direction, as viewed in FIG. 3, and the clutch will yield by the movement of the clutch disk member 112 and the balls 116 carried thereby relative to the clutch pinion member 106 which will reciprocate along the shaft 108 without moving in a rotational sense therewith. As previously indicated, the movable structure is retained in the rearward position into which it has been moved and it is then necessary for the driver to return the movable structure 14 back into its operative position by actuating the control lever.

It will also be noted that, because the power-driven assembly is connected between the mounting arm 16 and the movable structure 14 and, because no relative movement takes place between the mounting arm 16 and the movable structure 14 during the forward movement of the movable structure, the forward movement can take place in its normal way unaffected by the presence of the assembly 86. In this regard, when an unwanted forwardly directed force is applied to the movable structure 14 which is sufficient to overcome the spring bias of the springs 62, the movable structure 14 together with the cover member 34 and mirror unit 24 is capable of being moved forwardly through a range of forward movement, such as shown in FIG. 4. This movement is accomplished by movement of the mounting arm 16 about the pivot pin 48 with the movable structure 14 maintained in its stopped position with respect to the mounting arm 16. During this movement, in which cam follower 20 is disengaged from cam surface 18, the bias of the spring system 22 will increase as the distance of forward movement of the movable structure 14 out of its operating position within the forward range of movement increases. When the unwanted forwardly directed force is removed or released, the biasing spring system 22 is then operable to return the movable structure 14, including the movable cover member 34 and the mirror unit 24, back into its operative position.

It thus will be seen that the objects of this invention have been fully and effectively accomplished. It will be realized, however, that the foregoing preferred specific embodiment has been shown and described for the purpose of this invention and is subject to change without departure from such principles. Therefore, this invention includes all modifications encompassed within the spirit and scope of the following claims.

What is claimed is:

1. A rearview mirror assembly for mounting on the exterior of a motor vehicle so as to be viewed by the driver within the vehicle, said rearview mirror comprising a fixed support structure adapted to be fixed to the exterior of the vehicle, a movable mirror housing structure, a spring-biased mounting assembly mounting said movable structure on said fixed structure (1) for spring-biased movement into a normal operating position wherein said movable structure extends laterally outwardly from the exterior of the vehicle where it is susceptible to the application of unwanted forwardly directed forces or unwanted rearwardly directed forces, (2) for movement forwardly through a forward range of movement out of said operative position in response to the application to said movable structure of an unwanted forwardly directed force sufficient to overcome the spring bias of said movable structure into said operative position which spring bias increases as the distance of forward movement of the movable structure out of said operating position within said forward range of movement increases so that upon release of the application of the unwanted forwardly directed force while the movable structure is within said forward range of movement the spring bias is operable to return said movable structure to said operative position and (3) for movement rearwardly through a rearward range of movement out of said operating position in response to the application to said movable structure of an unwanted rearwardly directed force sufficient to overcome the spring bias of said movable structure into said operative position which spring bias decreases to zero as the distance of rearward movement of the movable structure out of said operative position reaches an intermediate point within said rearward range of movement and thereafter reverses to bias said movable structure into a rearwardly folded limiting position, a mirror unit mounted with respect to said movable structure for movement into any position within a range of movement positions suitable to accommodate different drivers, a power driven assembly operatively connected with said movable structure for permitting the aforesaid forward movement of said movable structure within said forward range of movement and for applying a yieldable force pattern to said movable structure sufficient to overcome the spring bias within the rearward range of movement so as to selectively move said movable structure between said operative and rearwardly folded limiting positions while enabling said movable structure to be moved rearwardly from said operative position within the rearward range of movement by the application of an unwanted rearwardly directed force to said movable structure sufficient to overcome the yieldable force pattern of said power-driven assembly.

2. A rearview mirror assembly as defined in claim 1 including a manually controlled mechanism operatively connected with said mirror unit for effecting movement of said mirror unit with respect to said movable structure in response to a remote manual movement by the driver from within the vehicle.

3. A rearview mirror assembly as defined in claim 2 wherein said mirror unit movement effecting mechanism is a power pack assembly fixed to said movable structure including electrically controlled electrical motors, said power pack assembly and said mirror unit having cooperating snap-in connections for mounting said mirror unit on said power pack assembly and for effecting movement of said mirror unit from said power pack assembly by the operation of said electrical motors.

4. A rearview mirror assembly as defined in claim 1 wherein said spring-biased mounting assembly includes a mounting arm pivotally connected with said fixed structure for movement with respect thereto about a first generally vertically extending axis toward and away from a stop position with respect to said fixed structure, said movable structure being pivotally connected with said arm for movement with respect thereto about a second axis extending generally parallel with said first axis toward and away from a stop position with respect to said arm, said spring biased mounting assembly also including a cam surface on said fixed structure, a cam follower on said movable structure and a spring system connected between said fixed structure and said movable structure in such a way that when said movable structure is in said operative position the spring is operable to bias (1) said movable structure into its stop position with respect to said arm, (2) said arm into its stop position with respect to said fixed structure, and (3) said cam follower into engagement with said cam surface.

5. A rearview mirror assembly as defined in claim 4 wherein said power-driven assembly includes an arcuate gear rack fixed to said mounting arm, said gear rack being arcuate about the second axis and having gear teeth on a concave side thereof, said power-driven assembly including a reversible electric motor and power transmission components cooperatively mounted in housing parts fixed with respect to said movable structure.

6. A rearview mirror assembly as defined in claim 5 wherein said power transmission components includes one or more drive pinions having gear teeth disposed in meshing engagement with the gear teeth on the concave side of said arcuate gear rack.

7. A rearview mirror assembly as defined in claim 6 wherein said power transmission components includes a yieldable clutch between said electric motor and said drive pinions.

8. A rearview mirror assembly as defined in claim 7 wherein said clutch includes a clutch disk member fixed to a shaft to which said drive pinions are fixed, a clutch pinion member mounted on said shaft for rotational and axial movement with respect thereto, a spring assembly resiliently biasing said clutch pinion member axially toward said clutch disk member and a plurality of balls carried by one of said clutch members and normally engageable within ball-receiving depressions in the other of said clutch members so as to drivingly interconnect the two clutch members for rotation together but yieldingly disengageable from said ball-receiving depressions to allow relative rotation to occur between said clutch members.

9. A rearview mirror assembly as defined in claim 8 wherein said power transmission components include a worm gear driven by said reversible electric motor, a worm gear pinion mounted on another shaft parallel with said first mentioned shaft and disposed in meshing relation to said worm gear, and a clutch driving pinion gear fixed to said another shaft disposed in meshing relation with said clutch pinion member.

10. A rearview mirror assembly as defined in claim 5 wherein the forward range of movement of said movable structure is accomplished by the pivotal movement of said mounting arm about said first pivotal axis while said movable structure is retained in its stop position with respect to said arm and the cam follower is disengaged from said cam surface.

11. A rearview mirror assembly as defined in claim 10 wherein the rearward range of movement is accomplished by pivoting the movable structure about said second axis while the engagement of the cam follower along the cam surface causes the arm to pivot about the first pivotal axis to thereby move the second axis on opposite sides of a plane passing through the effective points of connection of said spring with said fixed and movable structures.

12. A rearview mirror assembly as defined in claim 11 wherein said spring system is connected with said fixed structure (1) laterally outwardly and rearwardly of said first axis, (2) laterally outwardly and forwardly of said second axis when said movable structure is in said operative position, and (3) laterally inwardly and rearwardly of said second pivotal axis when said movable structure is in said rearwardly folded limiting position.

13. A rearview mirror assembly as defined in claim 5 wherein said fixed and movable structures are unfinished exteriorly and separate fixed and movable cover members are provided to define an exterior configuration and finish for said fixed and movable structures respectively, said separate fixed and movable cover members being constructed so as to be mounted in covering relation to said fixed and movable structures respectively while said movable structure is mounted on said fixed structure, said separate fixed and movable cover members being fixedly secured to said fixed and movable structures respectively after being mounted in covering relation thereto so as to present a finished exterior surface which substantially completely covers said fixed and movable structures when said movable structure is in said operative position with respect to said fixed structure while permitting movement of said movable structure out of said operative position with respect to said fixed structure.

14. A rearview mirror assembly as defined in claim 13 wherein said movable cover member is in the form of a thin wall shell having upper, lower, forward and laterally outward merging wall portions defining a finished convexly curved exterior surface and a mounting strap fixedly interconnected between the rearward laterally inward corners of said upper and lower wall portions so as to define (1) with rearward edges of said upper, lower and laterally outward wall portions a rearward opening through which said mirror unit is disposed and (2) with laterally inward edges of said upper, lower and forward wall portions a laterally inward opening through which said movable mirror housing structure is received.

15. A rearview mirror assembly as defined in claim 13 wherein said movable cover member is fixedly secured to said movable structure by fasteners extending between said mounting strap and an abutting portion of said movable structure.

16. A rearview mirror assembly as defined in claim 15 wherein said fixed cover member is in the form of an irregular tubular wall having a laterally outward peripheral edge disposed in closely spaced relation with the laterally inward edges defining the laterally inward opening of said movable cover member when said movable structure is in said operative position.

17. A rearview mirror assembly as defined in claim 13 including a manually controlled mechanism operatively connected with said mirror unit for effecting movement of said mirror unit with respect to said movable structure in response to a remote manual movement by the driver within the vehicle.

18. A rearview mirror assembly as defined in claim 17 wherein said mirror unit movement effecting mechanism is a power pack assembly fixed to said movable structure including electrically controlled electrical motors, said power pack assembly and said mirror unit having cooperating snap-in connections for mounting said mirror unit on said power pack assembly and for effecting movement of said mirror unit from said power pack assembly by the operation of said electrical motors.

19. A rearview mirror assembly as defined in claim 1 wherein said fixed and movable structures are unfinished exteriorly and separate fixed and movable cover members are provided to define an exterior configuration and finish for said fixed and movable structures respectively, said separate fixed and movable cover members being constructed so as to be mounted in covering relation to said fixed and movable structures respectively while said movable structure is mounted on said fixed structure, said separate fixed and movable cover members being fixedly secured to said fixed and movable structures respectively after being mounted in covering relation thereto so as to present a finished exterior surface which substantially completely covers said fixed and movable structures when said movable structure is in said operative position with respect to said fixed structure while permitting movement of said movable structure out of said operative position with respect to said fixed structure.

20. A rearview mirror assembly as defined in claim 19 wherein said movable cover member is in the form of a thin wall shell having upper, lower, forward and laterally outward merging wall portions defining a finished convexly curved exterior surface and a mounting strap fixedly interconnected between the rearward laterally inward corners of said upper and lower wall portions so as to define (1) with rearward edges of said upper, lower and laterally outward wall portions a rearward opening through which said mirror unit is disposed and (2) with laterally inward edges of said upper, lower and forward wall portions a laterally inward opening through which said movable mirror housing structure is received.

21. A rearview mirror assembly as defined in claim 20 wherein said movable cover member is fixedly secured to said movable structure by fasteners extending between said mounting strap and an abutting portion of said movable structure.

22. A rearview mirror assembly as defined in claim 21 wherein said fixed cover member is in the form of an irregular tubular wall having a laterally outward peripheral edge disposed in closely spaced relation with the laterally inward edges defining the laterally inward opening of said movable cover member when said movable structure is in said operative position.

* * * * *